(12) United States Patent
Jonsjord (10) Patent No.: US 9,778,069 B2
(45) Date of Patent: Oct. 3, 2017

(54) DETERMINING A POSITION OF A HYDRAULIC SUBSEA ACTUATOR

(71) Applicant: FMC Kongsberg Subsea AS, Kongsberg (NO)

(72) Inventor: Ole Vidar Jonsjord, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 39 days.

(21) Appl. No.: 14/404,425

(22) PCT Filed: May 27, 2013

(86) PCT No.: PCT/EP2013/060851
§ 371 (c)(1),
(2) Date: Nov. 26, 2014

(87) PCT Pub. No.: WO2013/178579
PCT Pub. Date: Dec. 5, 2013

(65) Prior Publication Data
US 2015/0192431 A1 Jul. 9, 2015

(30) Foreign Application Priority Data

May 29, 2012 (NO) .................................. 20120627

(51) Int. Cl.
*G01D 5/14* (2006.01)
*E21B 33/035* (2006.01)
*F15B 15/28* (2006.01)

(52) U.S. Cl.
CPC .......... *G01D 5/14* (2013.01); *E21B 33/0355* (2013.01); *F15B 15/2838* (2013.01)

(58) Field of Classification Search
CPC .......... G01D 5/14; G01D 5/145; H02K 49/102
See application file for complete search history.

(56) References Cited

U.S. PATENT DOCUMENTS

| 3,654,891 A | 4/1972 | Aas et al. |
| 4,109,725 A * | 8/1978 | Williamson .......... E21B 34/108 137/906 |
| 6,269,641 B1 * | 8/2001 | Dean ...................... E21B 23/04 166/344 |

(Continued)

FOREIGN PATENT DOCUMENTS

| DE | 40 32 167 C1 | 4/1992 |
| GB | 2 073 822 A | 10/1981 |

(Continued)

*Primary Examiner* — Jermele M Hollington
*Assistant Examiner* — Feba Pothen (57) ABSTRACT

A method and an apparatus (280) for determining an estimate of a position of a hydraulic subsea actuator (200), wherein the hydraulic subsea actuator (200) has a fluid port (220) fluidly connected to a fluid source (260). The apparatus (280) comprises a hydraulic cylinder (310) connected in series between the fluid source (260) and the fluid port (220) of the hydraulic subsea actuator, and a movable piston (320) arranged in the second hydraulic cylinder (310), a position determining device, arranged to determine a position of the movable piston (320), and a signal processing device (350), arranged to calculate the estimate of the position of the hydraulic subsea actuator based on the position of the movable piston.

11 Claims, 5 Drawing Sheets

(56) References Cited

U.S. PATENT DOCUMENTS

| | | |
|---|---|---|
| 2002/0124889 A1 | 9/2002 | Sundararajan |
| 2006/0237196 A1 | 10/2006 | Tips |
| 2011/0232474 A1 | 9/2011 | Geiger |
| 2012/0000646 A1* | 1/2012 | Liotta .................. E21B 33/062 |
| | | 166/85.4 |

FOREIGN PATENT DOCUMENTS

| | | |
|---|---|---|
| WO | WO 2005/113988 A1 | 12/2005 |
| WO | WO 2011/048469 A1 | 4/2011 |

* cited by examiner

DETERMINING A POSITION OF A HYDRAULIC SUBSEA ACTUATOR

TECHNICAL FIELD OF THE INVENTION

The present invention relates to monitoring hydraulic equipment.

More specifically, the invention relates to a method and apparatus for determining an estimate of a position of a hydraulic subsea actuator.

BACKGROUND OF THE INVENTION

Hydraulic actuators are widely used, e.g. in oil and gas industry. In subsea equipment, for instance in a subsea wellhead, a christmas tree, a blow out preventer, a manifold, a tubing string, or a landing string of a subsea oil and/or gas well, hydraulic actuators are frequently used for operating valves, the actuators being located at inaccessible areas. A recurring problem is to monitor the state of such hydraulic subsea actuators, in particular to determine their actuator position. A particular challenge is determining such actuator position without making modifications or adaptations to the hydraulic subsea actuator. In case of a subsea actuator, e.g., a subsea test tree valve actuator, space constraints or other limitations may make it impossible or inconvenient to provide the actuator itself with a position determining device. Also, strict safety constraints and other requirements must be complied with.

Hence, there is a general need in the art for providing a method and an apparatus for determining an estimate of a position of a hydraulic subsea actuator.

SUMMARY OF THE INVENTION

The method and an apparatus for determining an estimate of a position of a hydraulic subsea actuator according to the invention have been are defined by the appended claims.

DETAILED DESCRIPTION OF THE INVENTION

Figure 1:
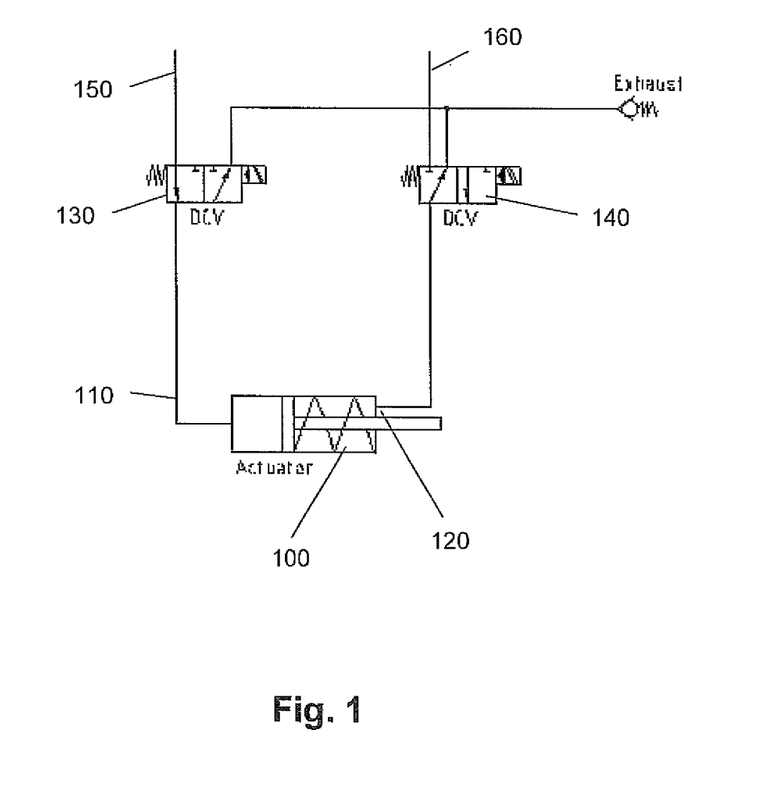
FIG. 1 is a schematic block diagram illustrating a hydraulic subsea actuator without means for determining the position of the actuator.

FIG. 1 is a schematic block diagram illustrating a hydraulic subsea actuator 100 without means for determining the position of the actuator.

The hydraulic actuator 100 is a hydraulic subsea actuator, e.g. an actuator operating a valve or another moveable element included in a well head, a Christmas tree, a blow out preventer, a manifold, a tubing string, or a landing string of a subsea oil and/or gas well.

The hydraulic subsea actuator 100 has a first fluid port 120 connected to a first fluid source 160 via a first hydraulic control valve 140. The hydraulic subsea actuator 100 also has a second fluid port 110 connected to a second fluid source 150 via a second hydraulic control valve 130. The first and second fluid ports are arranged at opposite sides of a movable piston in the hydraulic subsea actuator.

In the case of a subsea actuator, e.g., a subsea test tree valve actuator, space constraints or other limitations make it impossible or inconvenient to provide the actuator itself with a position determining device.

In the present disclosure, the position of the actuator may be understood as the position of a piston in the actuator, or a position of an element that moves in correspondence with the piston in the actuator. In the simplest case the position may have only two values, e.g. corresponding to a closed or open position of a valve. Alternatively, the position may take a number of discrete values within a finite set, or the position may be considered as a continuous quantity within a range.

Figure 2:
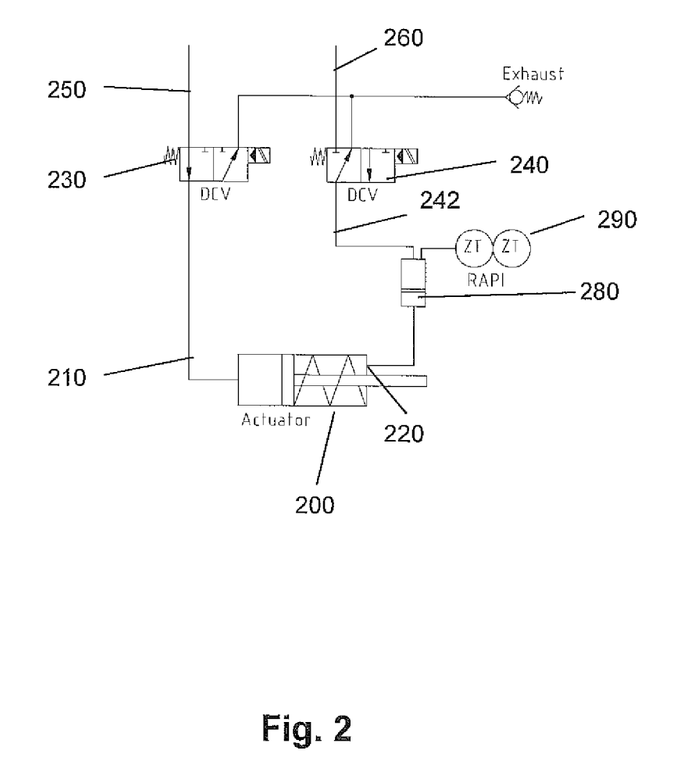
FIG. 2 is a schematic block diagram illustrating a hydraulic subsea actuator connected to an apparatus for determining an estimate of the position of the actuator.

FIG. 2 is a schematic block diagram illustrating a hydraulic subsea actuator connected to an apparatus for determining an estimate of the position of the actuator.

The hydraulic subsea actuator 200 may be a hydraulic subsea valve actuator. The hydraulic subsea actuator 200 may, e.g., be an actuator operating a valve or another element included in a well head, a Christmas tree, a blow out preventer, a manifold, a tubing string, or a landing string of a subsea oil and/or gas well. The hydraulic subsea actuator 200 may be linear.

The hydraulic subsea actuator 200 has a first fluid port 220 fluidly connected to a first fluid source 260 via a first hydraulic control valve 240. The hydraulic subsea actuator 200 also has a second fluid port 210 fluidly connected to a second fluid source 250 via a second hydraulic control valve 230. The first and second fluid ports are arranged at opposite sides of a movable piston in the hydraulic subsea actuator 200.

The actuator 200 has been illustrated with a spring which may be a fail-safe closing spring that drives the actuator to a closed position as a default, e.g. in the case of hydraulic pressure failure. However, the actuator may alternatively be an actuator without such a fail-safe closing spring.

It should be understood that each of the fluid sources 260 and 250 may actually operate as a fluid supply or a fluid return, depending on the operating circumstances.

In order to determine an estimate of the position of the hydraulic subsea actuator 200, an apparatus 280 for determining such an estimate is connected in the hydraulic supply line, between a connection 242 of the first hydraulic control valve 240 and the first fluid port 220 of the hydraulic subsea actuator 200.

The apparatus 280 may be connected separately from the hydraulic subsea actuator 200.

The apparatus 280 may be connected remotely from the hydraulic subsea actuator 200.

The apparatus 280 includes a hydraulic cylinder connected in series between the fluid source 260, or more particularly the control valve 240 that is connected to the fluid source 260, and the fluid port 220 of the hydraulic subsea actuator 200. A movable piston, arranged in the hydraulic cylinder, will move in the hydraulic cylinder in response to a movement of the hydraulic subsea actuator 200. A position determining device 290 is included in the apparatus 280 and is arranged to determine a position of the movable piston 280. The position determining device 290 is further communicatively connected to a signal processing device (not shown in FIG. 2) which is arranged to calculate the estimate of the position of the hydraulic subsea actuator 200 based on the determined position of the movable piston.

Further possible details of the apparatus 280 will be described with reference to FIGS. 3 and 4.

Figure 3:
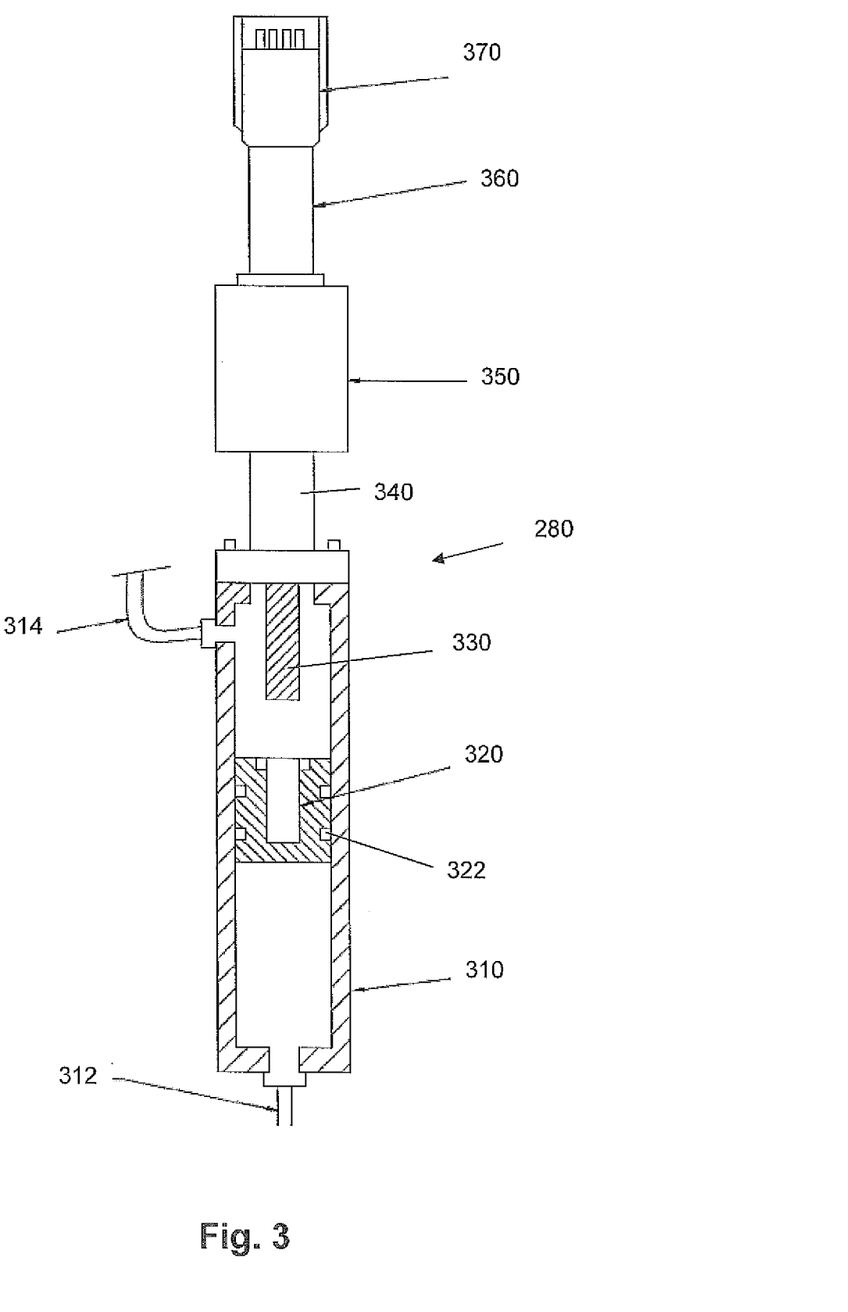
FIG. 3 is a schematic diagram illustrating an embodiment of an apparatus for determining an estimate of a position of a hydraulic subsea actuator.

FIG. 3 is a schematic diagram illustrating an embodiment of an apparatus 280 for determining an estimate of a position of a hydraulic subsea actuator.

The apparatus 280 comprises a hydraulic cylinder 310. The cylinder has a hydraulic connection 314 which, when the apparatus is operative, is connected to the fluid source 260, possibly via the control valve 240, in particular the connector 242 of the control valve 240. The hydraulic cylinder also has a hydraulic connection 312 which, when the apparatus is operative, is connected to the fluid port 220 of the hydraulic subsea actuator 200, as already explained with reference to FIG. 2 and the corresponding description above. A piston 320 is arranged in the second hydraulic cylinder 310 and is adapted to move along the length of the cylinder 310. Since the cylinder 310 and the cylinder of the hydraulic subsea actuator 200 and all fluid lines are filled with a substantially incompressible hydraulic fluid, such as hydraulic oil, a change in the position of the hydraulic subsea actuator 200 will result in the movement of the piston 320 in the hydraulic cylinder 310 in the apparatus 280.

The hydraulic cylinder 310 has a cylinder stroke volume which may be substantially equal to or larger than the stroke volume of the hydraulic subsea actuator 200.

The apparatus 280 further comprises a position determining device, arranged to determine a position of the movable piston 320, and a signal processing device 350. The position determining device is arranged to calculate the estimate of the position of the hydraulic subsea actuator based on the determined position of the movable piston.

The position determining device may, e.g., be arranged to determine the position of the movable piston by the use of electromagnetic position determination. For instance, the position determining device may include a ferromagnetic element and a magnetic switch. In such a case, the electromagnetic position determination may include detecting the position of the magnetic element relative to the magnetic switch. Alternatively, a plurality (e.g., 2, 3, 4 or more) of ferromagnetic elements and/or a plurality (e.g., 2, 3, 4 or more) of magnetic switches may be employed.

As an example, a number of ferromagnetic elements 322 may be arranged along the length of the piston 320, and magnetic switches such as reed switches may be arranged in a protruding rod 330, arranged in a central area of the cylinder 310, which is adapted to be received by a corresponding bore in the piston 320. Alternatively, magnetic switches such as reed switches may be arranged in or outside the wall of the cylinder 310.

Numerous alternatives for determining the position of the movable piston exist, including the arrangement and use of optical (e.g., photoelectric), acoustic (e.g., ultrasonic), or capacitive proximity detectors or position sensors. Ferromagnetic elements and magnetic switches such as reed switches may advantageously be used due to their simplicity and reliability, and since they are passive devices.

In an aspect, the position determining device may be arranged to determine a plurality of discrete positions of the movable piston 320. In the simplest case, only two positions need to be determined. In such a case, the signal processing device 350 may be arranged to determine if the hydraulic subsea actuator 200 is open or closed. The number of determinable positions may however be 3, 4, 5, 6 or higher, depending on the resolution required.

In another aspect, the signal processing device 350 may be arranged to determine the position of the movable piston 320 from a continuous range of positions.

The signal processing device 350 may be arranged to provide the estimate of the position of the hydraulic subsea actuator 200 as an electrical output signal. The output signal may be digital or analog. For instance, the output signal may be a 4-20 mA analog current signal, where a certain sub-range of the total range 4-20 mA corresponds to a closed actuator position while another sub-range of the total range 4-20 mA corresponds to an open actuator position. Alternatively, the output signal may be provided as a hydraulic or optical signal, or another type of analog, electronic signal, or a digital, electronic signal.

In yet another aspect, the signal processing device 350 may be configured to calculate the estimate of the position of the hydraulic subsea actuator by multiplying the position of the movable piston 320 with a predetermined proportionality constant.

The hydraulic subsea actuator 200 may include an actuator piston which has a first piston area, i.e. its effective piston area, while the movable piston 320 in the hydraulic cylinder 310 may have a second piston area, i.e. its effective piston area. The proportionality constant may in such a case be selected (e.g. pre-selected) as the ratio between the second piston area and the first piston area.

In a particular example, the first piston area may be substantially equal to the second piston area. In such a case the proportionality constant will be essentially equal to 1.

In any of the aspects of the apparatus, the movable piston 320 may be provided with a fluid passage, e.g. a slit or aperture, having an area which is substantially less than the area of the movable piston. As an example, the area of the fluid passage may be in the range of $1/10000$-$1/500$ of the area of the movable piston. This particular arrangement, or similar arrangement, may allow a slowly varying flow of hydraulic fluid without moving the movable piston 320. Such an arrangement may be useful for allowing the apparatus to ignore particularly slow variations in the hydraulic flow, which are often due to temperature variations or temperature gradients between the hydraulic subsea actuator 200 and the hydraulic cylinder 310 in the apparatus 280.

In another aspect, the apparatus may comprise at least one temperature sensor. As an example, a first temperature sensor may be arranged to measure a temperature at the hydraulic subsea actuator 200, while a second temperature sensor may be arranged to measure a temperature at the hydraulic cylinder 310. In another aspect, one of these temperatures may be measured while the other may be assumed to have a certain predetermined approximate value. In such a case the signal processing device may be arranged to compensate for a temperature gradient between the hydraulic subsea actuator 200 and the hydraulic cylinder 310 by means of a measurement signal provided by such a temperature sensor.

In any of the above aspects of the apparatus, the hydraulic subsea actuator 200 may be an actuator that controls a valve included in a well head, a christmas tree, a blow out preventer, a manifold, a tubing string, or a landing string of a subsea oil and/or gas well. The apparatus may advantageously be used during a drilling, testing, completion, workover or production phase of the subsea oil and/or gas well.

FIG. 3 further illustrates a cylindrical extension portion 340 axially extending between the hydraulic cylinder 310 and an encapsulation for the signal processing device 350.

Another cylindrical extension portion 360 axially extends between the encapsulation for the signal processing device 350 and the electrical connector 370, which includes electrical connections for supplying the signal processing device 350 with electrical power and connections for reading out signals provided by the signal processing device 350.

Figure 4:
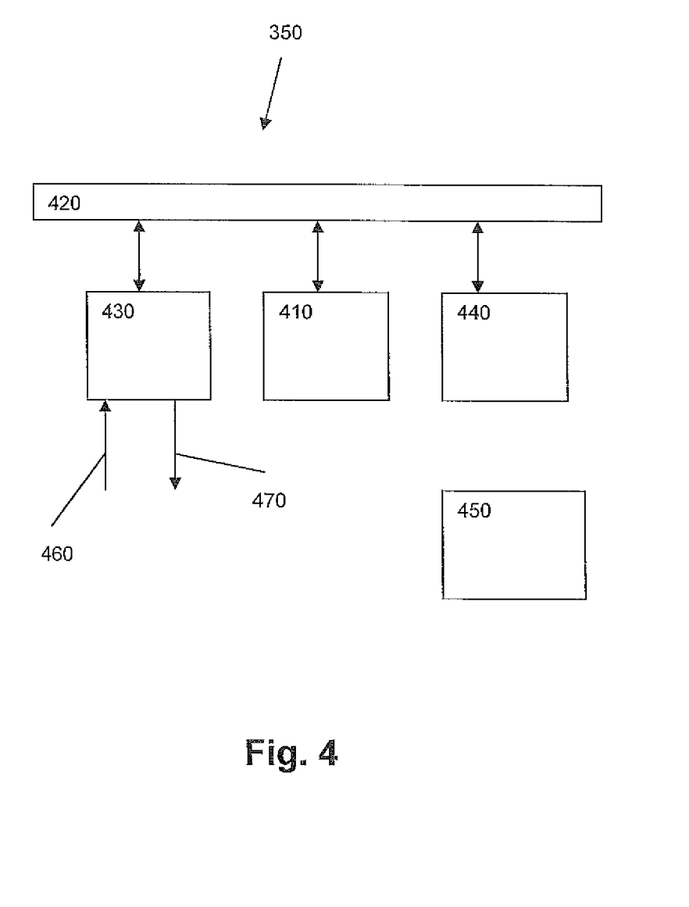
FIG. 4 is a schematic diagram illustrating a signal processing device for an apparatus for determining an estimate of a position of a hydraulic subsea actuator.

FIG. 4 is a schematic diagram illustrating a signal processing device 350 for an apparatus for determining an estimate of a position of a hydraulic subsea actuator.

The signal processing device 350 comprises a digital bus 420, which is operatively connected to a processor, such as a microprocessor, 410. The bus 420 is also operatively connected to a memory 440, which may include a volatile working memory portion such as a random access memory portion, which is used for temporarily storing data, and a non-volatile, fixed portion such as a ROM, Flash, EPROM, EEPROM, etc, which may be used for storing processing instructions (computer program instructions) and fixed data.

The bus 420 is also operatively connected to an input/output device 430, which has at least an input 460 and an output 470. Each of the input 460 and output 470 may be digital or analog. As an example, the input and output are both analog 4-20 mA current signals. In such a case the input/output device may include an ND converter and a D/A converter, in order to adapt the signal provided to the analog input 460 to a digital signal to be processed by the processor 410, and in order to adapt a digital signal provided by the processor 410 to an analog output signal at the output 470.

A signal representing the position of the piston 320 in the apparatus may be connected to the input 460. A signal representing the estimate of the hydraulic subsea actuator is provided at the output 470.

The processing of the signal at the input 460, resulting in the signal provided at the output, is performed by the processor 410 in accordance with processing instructions held in a portion of the memory 440. This processing may be performed, as already explained, as the function of the signal processing device 350.

The signal processing device 350 may further comprise, or be connected to, a power supply 450 which provides electrical power to elements such as the bus 420, the processor 410, the input/output device 430 and the memory 440, and possibly other elements or devices connected to the bus 420.

Figure 5:
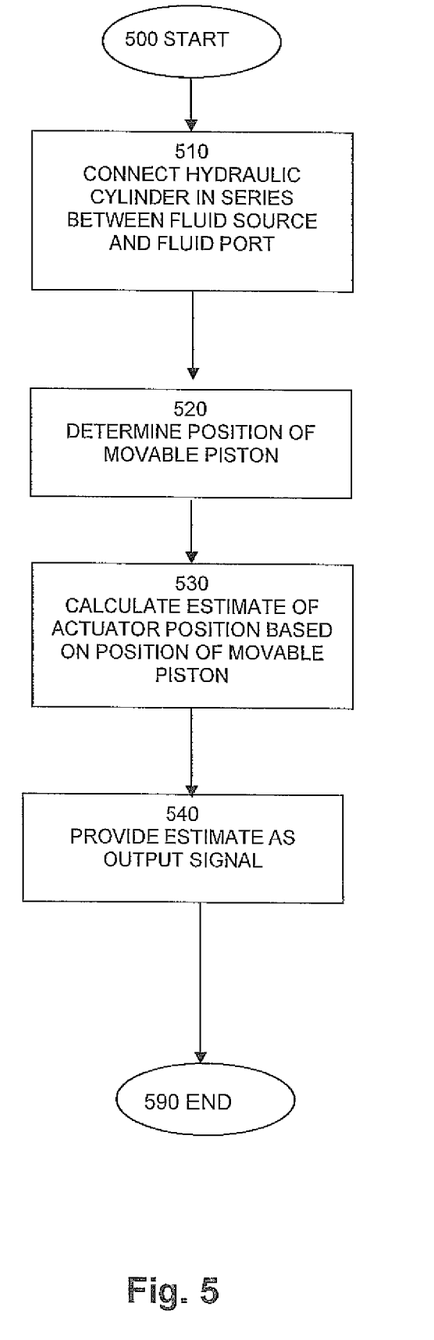
FIG. 5 is a schematic flow chart illustrating principles of a method for determining an estimate of a position of a hydraulic subsea actuator.

FIG. 5 is a schematic flow chart illustrating principles of a method for determining an estimate of a position of a hydraulic subsea actuator, wherein the hydraulic subsea actuator has a fluid port 220 connected to a fluid source 260, possibly via a hydraulic valve 240. The hydraulic subsea actuator 200 may be a hydraulic subsea valve actuator. The actuator may be a linear hydraulic actuator.

The method starts at the initiating step 500.

First, in the connection step 510, a hydraulic cylinder 310 is connected in series between the fluid source and the fluid port of the hydraulic subsea actuator. Also, movable piston 320 is arranged in the second hydraulic cylinder.

Next, in step 520, a position of the movable piston 320 is determined.

In a possible aspect of the method, the step 520 of determining the position of the movable piston 320 may comprise electromagnetic position determination. The electromagnetic position determination may include detecting the position of a magnetic element relative to a magnetic switch.

In another aspect of the method, the step 520 of determining the position of the movable piston may include determining one of a plurality of discrete positions. In such an aspect, the number of discrete positions may be two, and the step 530 of calculating the estimate of the position of the hydraulic subsea actuator 200 may include determining if the hydraulic subsea actuator 200 is open or closed.

Next, in step 530, the estimate of the position of the hydraulic subsea actuator 200 is calculated, based on the position of the movable piston 320.

In an aspect of the method, step 530 of determining a position of the movable piston 320 may include determining the position from a continuous range of positions.

In an aspect of the method, the hydraulic subsea actuator has an actuator stroke volume, and the hydraulic cylinder 310 has a cylinder stroke volume substantially equal to or larger than the actuator stroke volume.

In an aspect of the method, the estimate of the position of the hydraulic subsea actuator is provided as an electrical output signal.

In an aspect of the method, the step 530 of calculating the estimate of the position of the hydraulic subsea actuator comprises multiplying the position of the movable piston 320 with a proportionality constant.

In an aspect of the method, the hydraulic subsea actuator 200 includes an actuator piston that has a first piston area, while the movable piston 320 has a second piston area. In this case, the proportionality constant may be selected as the ratio between the second piston area and the first piston area. For example, the first piston area may be substantially equal to the second piston area.

In an aspect of the method, the movable piston 320 may be provided with a fluid passage with an area substantially less than an area of the movable piston 320. This will allow slow movements of the hydraulic subsea actuator 200 without moving the movable piston 320.

In an aspect of the method, the step 530 of calculating the estimate of the position of the hydraulic subsea actuator comprises compensating for a temperature gradient between the hydraulic subsea actuator 200 and the hydraulic cylinder 310 by means of a temperature measurement.

The estimate of the position of the hydraulic subsea actuator, calculated in accordance with the present disclosure, may be provided as an output signal in the output signal provision step 540.

The method may be terminated at the terminating step 590 or repeated, as appropriate.

The disclosed method may advantageously be performed during a drilling, testing, completion, workover or production phase of the subsea oil and/or gas well.

The invention claimed is:

1. A method for determining an estimate of a position of a hydraulic subsea actuator having a fluid port fluidly connected to a fluid source, the method comprising:
   connecting a hydraulic cylinder in series between the fluid source and the fluid port of the hydraulic subsea actuator, a movable piston being arranged in the hydraulic cylinder;
   determining a position of the movable piston; and
   calculating the estimate of the position of the hydraulic subsea actuator based on the position of the movable piston;
   wherein the step of calculating the estimate of the position of the hydraulic subsea actuator comprises multiplying the position of the movable piston with a proportionality constant, wherein the hydraulic subsea actuator includes an actuator piston having a first piston area, the movable piston has a second piston area, and the proportionality constant is the ratio between the second piston area and the first piston area.

2. The method according to claim 1, wherein the step of determining of the position of the movable piston includes detecting the position of a magnetic element relative to a magnetic switch.

3. The method according to claim 1, wherein the step of determining the position of the movable piston includes determining one of a plurality of discrete positions of the movable piston.

4. The method according to claim 3, wherein the plurality of discrete positions is two and the step of calculating the estimate of the position of the hydraulic subsea actuator includes determining if the hydraulic subsea actuator is open or closed.

5. The method according to claim 1, wherein the movable piston comprises a fluid passage having an area substantially less than an area of the movable piston, thereby allowing a slowly varying flow of hydraulic fluid through the movable piston without moving the movable piston.

6. The method according to claim 1, wherein the method is performed during at least one of a drilling, testing, completion, workover or production phase of a subsea oil and/or gas well.

7. An apparatus for determining an estimate of a position of a hydraulic subsea actuator having a fluid port fluidly connected to a fluid source, the apparatus comprising:
   a hydraulic cylinder which is connected in series between the fluid source and the fluid port of the hydraulic subsea actuator, the hydraulic cylinder including a movable piston;
   a position determining device which is configured to determine a position of the movable piston; and
   a signal processing device which is configured to calculate the estimate of the position of the hydraulic subsea actuator based on the position of the movable piston;
   wherein the signal processing device is configured to calculate the estimate of the position of the hydraulic subsea actuator by multiplying the position of the movable piston with a proportionality constant, wherein the hydraulic subsea actuator includes an actuator piston having a first piston area, the movable piston has a second piston area, and the proportionality constant is the ratio between the second piston area and the first piston area.

8. The apparatus according to claim 7, wherein the position determining device includes a magnetic element and a magnetic switch, and wherein the position determining device is configured to detect the position of the magnetic element relatively to the magnetic switch.

9. The apparatus according to claim 7, wherein the position determining device is configured to determine a plurality of discrete positions of the movable piston.

10. The apparatus according to claim 9, wherein the plurality of discrete positions is two and the signal processing device is configured to determine if the hydraulic subsea actuator is open or closed.

11. The apparatus according to claim 7, wherein the movable piston comprises a fluid passage having an area substantially less than an area of the movable piston to thereby allow a slowly varying flow of hydraulic fluid through the movable piston without moving the movable piston.

* * * * *